(12) United States Patent
Wallrafen (10) Patent No.: US 9,080,896 B2
(45) Date of Patent: Jul. 14, 2015

(54) METHOD FOR ANALYZING SIGNALS FROM AN ANGLE SENSOR

(75) Inventor: Werner Wallrafen, Hofheim (DE)

(73) Assignee: Continental Automotive GmbH, Hannover (DE)

( * ) Notice: Subject to any disclaimer, the term of this patent is extended or adjusted under 35 U.S.C. 154(b) by 138 days.

(21) Appl. No.: 13/498,091

(22) PCT Filed: Sep. 23, 2010

(86) PCT No.: PCT/EP2010/064027
§ 371 (c)(1),
(2), (4) Date: Mar. 23, 2012

(87) PCT Pub. No.: WO2011/036196
PCT Pub. Date: Mar. 31, 2011

(65) Prior Publication Data
US 2012/0176070 A1    Jul. 12, 2012

(30) Foreign Application Priority Data
Sep. 24, 2009    (DE) .......................... 10 2009 042 473

(51) Int. Cl.
*G01B 7/30*    (2006.01)
*H02P 6/16*    (2006.01)
(Continued)

(52) U.S. Cl.
CPC .......... *G01D 5/24461* (2013.01); *G01D 3/0365* (2013.01); *G01D 5/145* (2013.01); *G01D 5/2448* (2013.01); *G01D 5/24476* (2013.01)

(58) Field of Classification Search
CPC .......... G01D 5/145; G01B 7/30; G01B 11/16; G01B 11/165; G01R 33/02; G01R 33/077; G01L 3/102; G01L 3/103

USPC .......... 324/207.11, 207.12, 207.13, 202, 225, 324/326, 207.14, 228–260, 160–180, 324/207.2–207.25, 207.26
See application file for complete search history.

(56) References Cited

U.S. PATENT DOCUMENTS 5,463,393 A * 10/1995 Havlicsek ...................... 341/115
5,606,254 A *  2/1997 Xie et al. ....................... 324/174
(Continued)

FOREIGN PATENT DOCUMENTS

| CN | 1343889 | 4/2002 |
| CN | 1789920 | 6/2006 |

(Continued)

OTHER PUBLICATIONS

English translation of an Office Action dated Sep. 2, 2014 issued in the corresponding Chinese Patent Application No. 2010800426803.

*Primary Examiner* — Arleen M Vazquez
*Assistant Examiner* — Neel Shah
(74) *Attorney, Agent, or Firm* — Cozen O'Connor (57) ABSTRACT

A method for analyzing signals from an angle sensor including at least two sensing elements which span a plane and including a rotatable element for varying the plane, the element being spaced from same. The angle sensor also includes a brushless electromotor which is controlled according to the method. The method for analyzing signals from an angle sensor comprises at least two sensing elements, said method producing high-definition measured results using sensing elements that map a full circle. This is achieved in that the sensing elements capture at least one first and one second vector of the field lying on the plane, the vectors being linearly independent of each other. A further variable, which is dependent on the distance between the plane and the rotatable element, is additionally detected, and the amplitudes of the signals of the first and the second sensing elements are controlled with the value of the further variable.

13 Claims, 7 Drawing Sheets

(51) Int. Cl.
*G01D 5/244* (2006.01)
*G01D 3/036* (2006.01)
*G01D 5/14* (2006.01)

(56) References Cited

U.S. PATENT DOCUMENTS

| | | | |
|---|---|---|---|
| 5,627,466 A * | 5/1997 | Spies et al. | 324/207.21 |
| 6,229,299 B1 * | 5/2001 | Strashny | 324/174 |
| 6,566,860 B1 * | 5/2003 | Lin et al. | 324/207.12 |
| 6,956,366 B2 * | 10/2005 | Butzmann | 324/207.21 |
| 7,401,001 B2 * | 7/2008 | Stek et al. | 702/150 |
| 2005/0030012 A1 | 2/2005 | Kunz-Vizenetz | |
| 2007/0093980 A1 | 4/2007 | Stek et al. | |
| 2009/0001964 A1 * | 1/2009 | Strzalkowski | 324/202 |
| 2009/0102460 A1 * | 4/2009 | Schott et al. | 324/207.2 |

FOREIGN PATENT DOCUMENTS

| | | | | |
|---|---|---|---|---|
| CN | 100406895 | | 7/2008 | |
| DE | 43 19 322 | | 12/1994 | |
| DE | 43 19 322 A1 | | 12/1994 | |
| DE | 43 193 22 A1 | | 12/1994 | |
| DE | 101 43 286 | | 4/2002 | |
| DE | 101 43 286 A1 | | 4/2002 | |
| EP | 1 697 697 | | 11/2008 | |
| EP | 1 697 697 B1 | | 11/2008 | |
| EP | WO2009/099054 | * | 8/2009 | 324/207.25 |
| EP | 2 101 157 A2 | | 9/2009 | |
| JP | 2 307 012 | | 12/1990 | |
| JP | 2-307012 A | | 12/1990 | |
| JP | 02-307012 A | | 12/1990 | |
| JP | 07-055408 | | 3/1995 | |
| JP | 2007-511778 A | | 5/2007 | |

* cited by examiner

METHOD FOR ANALYZING SIGNALS FROM AN ANGLE SENSOR

CROSS REFERENCE TO RELATED APPLICATIONS

This is a U.S. national stage of application No. PCT/EP2010/064027, filed on 23 Sep. 2010. Priority is claimed on the following application German Application No. 10 2009 042 473.3, filed 24 Sep. 2009 the content of which is incorporated here by reference.

1. Field of the Invention

The invention relates to a method for analyzing signals from an angle sensor having at least two sensor elements that span a plane and a rotatable element spaced apart from this plane that varies a field and a brushless electric motor actuated according to this method.

2. Detailed Description of the Prior Art

Angle sensors are required in many technological areas. In particular in the automobile industry, angle sensors are required to detect the position of actuating valves and throttle valves, the position of variable camshaft controllers, the position of variable turbine geometry or the position of drive motors for an electric steering system. With brushless electric motors, a rotational angle sensor is necessary to commutate the alternating current driving the electric motor, especially if the brushless electric motor operates in a highly dynamic fashion, i.e. is operated in various rotational speed ranges, that is to say from very low rotational speeds to high rotational speeds, and the reverse operation is also used. In this context, it is necessary to sense the rotational angle of the rotor of the electric motor precisely and accurately for every operating state of the electric motor, with the result that the brushless electric motor can be operated with an alternating current which is correspondingly commutated. Various measurement principles are known for the angle sensors. When there are a series of measuring principles, recourse is made to a magnetic field which rotates with the rotor and whose position is analyzed by a magnetic-field-sensitive sensor. Very good measurement results are obtained with magnetic field sensors on the technological basis of the anisotropic magnetoresistive effect (AMR sensors). However, these AMR sensors have the disadvantage that they can only clearly represent a half circle, that is to say 180°. After 180°, the signal is repeated owing to the method of functioning of AMR angle sensors, with the result that a clear assignment of the measurement signals to the position of the rotor in the full circle becomes impossible.

The full circle measurement can be achieved, for example, with what are referred to as 2-D-Hall elements, GMR Hall measuring elements (Giant Magnetoresistive Effect) and TMR measuring elements (Tunnel Magnetoresistive Effect) as well as inductive sensors. Unfortunately, the sensor types 2-D-Hall, GMR, TMR and inductive sensors which provide clear 360° resolution have a strong dependence of the measuring signals on the distance between the rotatable element for varying the field for the plane in which the measuring elements are arranged. External influences during which this distance is varied therefore cause the measurement results of these 2D Hall sensor elements, GMR, TMR and inductive sensor elements to have a large error superimposed on them, which error leads to very poor measurement results. These external effects are, for example, the sum of all the tolerances when the angle sensor is installed in a system, temperature influences which change the distance and/or oscillations of the entire system in which the angle sensor is arranged.

SUMMARY OF THE INVENTION

An object of the present invention is to specify a method for analyzing signals from an angle sensor having at least two sensor elements that produces high-resolution measurement results with full-circle-coverage sensor elements, (for example 2D Hall sensor elements, GMR, TMR and inductive sensor elements).

Since the sensor elements sense at least a first and a second vector, linearly independent of one another, of the field in this plane, wherein in addition a further variable is sensed which is dependent on the distance between the plane and the rotatable element, and wherein the amplitudes of the signals of the first and second sensor elements are controlled with the absolute value of the further variable. It is possible to adapt the signals of the first and of the second sensor element to the changes in the distance between the plane and the rotatable element over the entire operation of the angle sensor. The signals of the first and of the second sensor element are therefore standardized to the distance between the plane and the rotatable element. The first and second sensor elements supply, after the standardization, sine signals and cosine signals that depend only on the rotational angle of the rotatable element and largely independent in their amplitude of the distance between the plane and the rotatable element. When a distance between the plane and the rotatable element is too small, the analog/digital converters are overdriven, therefore preventing the sine signals and cosine signals from being clipped.

In one embodiment of the method, information relating to fast changes in the distance between the plane and the rotatable element is removed from the absolute value, sensed by the third vector, of the field by a low-pass filter. Rapid changes result from bearing play of the brushless electric motor, vibrations and/or jolt-like changes in the rotational direction of the rotor of the brushless electric motor. This information is filtered from the signal of the third vector by the low-pass filter. Only information relating to slow changes in the distance between the plane and the rotatable element is present in the signal of the third vector downstream of the low-pass filter. This information comprises, for example, the sum of all the mechanical installation tolerances and/or temperature-induced changes in distance between the plane and the rotatable element, changes in the sensitivity of the sensor elements and/or the analysis circuit thereof, as well as changes in the field strength emanating from the rotatable element.

In one embodiment of the invention, the rotatable element is a magnet, a coil, a yoke, or a piece of sheet metal. With such elements it is very easy to rotate a magnetic field with the rotor of the brushless electric motor in order to sense the rotational angle of the rotor of the brushless electric motor. For this purpose, the sensor elements can be embodied in a magnetic-field-sensitive fashion. It is advantageous if the magnetic-field-sensitive sensor elements are embodied as giant magnetoresistive sensor elements (GMR), tunnel magnetoresistive sensor elements (TMR) or Hall sensor elements, since these sensor elements can clearly sense one full rotation of the magnetic field.

In one embodiment of the invention, the sensor elements pick up electromagnetic fields, wherein the sensor elements are embodied as inductive sensor elements. Clear sensing of the full circle of the rotor rotation is also possible with inductive sensor elements.

In one embodiment, sine signals and cosine signals are generated from the signals of the first and second vectors which are linearly independent of one another. This advantageously takes place in the CORDIC (COordinate Rotation DIgital computer) algorithm.

In one embodiment, the analog signals of the vectors are digitized by an analog/digital converter. Since the signals of the first and second linearly independent vectors are standardized by the signal of the distance between the plane and the rotatable element, the maximum resolution of the analog/digital converter can always be used without there being the risk of the signals of the first and of the second linearly independent vectors being clipped by overdriving of the analog/digital converter or of signals being transmitted with an excessively small amplitude to the analog/digital converter.

BRIEF DESCRIPTION OF THE DRAWINGS

The invention permits numerous embodiments. To clarify the invention further, a plurality of embodiments are illustrated in the drawings and will be described below.

In the drawings.

DETAILED DESCRIPTION OF THE PREFERRED EMBODIMENTS

Figure 1:
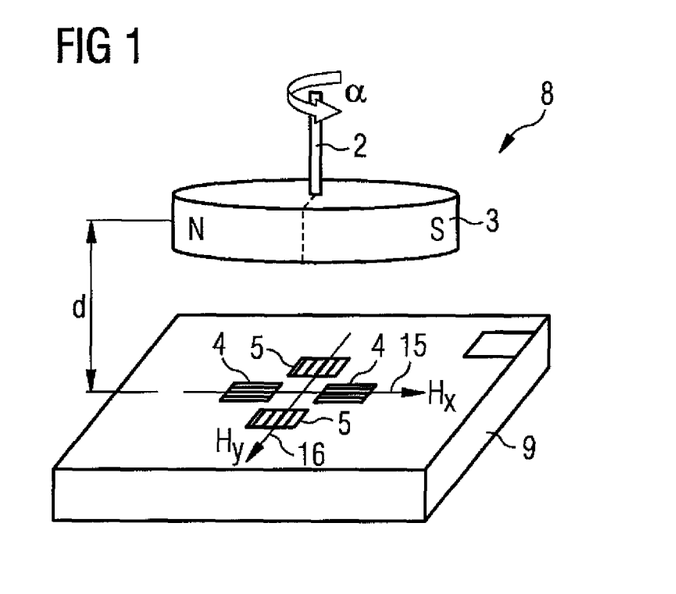
FIG. 1 is an angle sensor with a rotor on which a rotatable element for varying a field is arranged.

FIG. 1 shows an angle sensor 8 with a rotor 2 of a brushless electric motor on which a rotatable element 3 for varying a field is arranged. The rotatable element 3 is embodied here as a dipole magnet, wherein the north pole N and the south pole S are shown. Depending on the rotational angle α of the rotor 2 relative to the brushless electric motor, a first linearly independent vector 15 of the field strength denoted here by $H_x$, and a second linearly independent vector 16 of the field strength, denoted here by $H_y$, are induced in the sensor chip 9 of the angle sensor 8. These vectors 15, 16 are generated by a magnetic field and are strictly dependent on the rotational angle α and the associated position of the rotatable element 3. The first sensor element 4, embodied as a vertical Hall element, and the second sensor element 5, embodied as a vertical Hall element in the sensor chip 9, senses the components of the first linearly independent magnetic field vector 15 and of the second linearly independent magnetic field vector 16. The absolute value of the linearly independent magnetic field vectors 15 and 16 is particularly highly dependent on the distance d between the plane in which the first sensor element 4 and the second sensor element 5 are arranged and the plane in which the rotatable element 3 rotates in order to vary the magnetic field. If the distance d between the rotatable element 3 and the sensor chip 9 on which the first sensor element 4 and the second sensor element 5 are arranged becomes smaller, relatively high Hall voltages are generated in the sensor elements 4, 5, and if the distance d between the rotatable element 3 and the sensor chip 9 becomes larger, significantly lower Hall voltages are generated in the first sensor element 4 and the second sensor element 5. As a result, the uncontrolled output signals of the first sensor element 4 and of the second sensor element 5 become partially unusable for the further signal processing since they are either too small in order to utilize the full resolution of an analog/digital converter, or are so large that, for example, an analog/digital converter is overdriven, wherein part of the signal is cut off.

The situation will be explained in more detail below in FIG. 2a.

Figure 2:
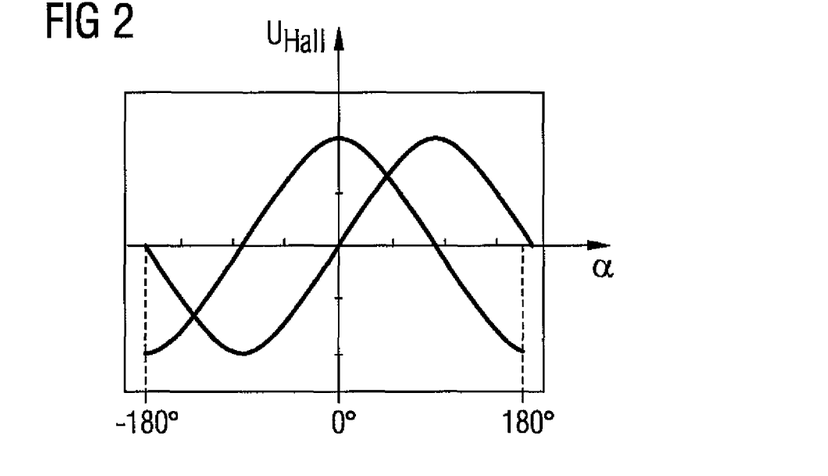
FIG. 2 is a graph of the output signals of the first sensor element and of the second sensor element with a constant distance between them.

FIG. 2 shows the sine-shaped and cosine-shaped output signals of the first sensor element 4 and of the second sensor element 5 with a constant distance d between the rotatable element 3 and the sensor chip 9 that forms the plane in which the first sensor element 4 and the second sensor element 5 are arranged. In FIG. 2, clean sine profiles and cosine profiles can be seen for the Hall voltage $U_{Hall}$, which permit unambiguous resolution of the rotational angle α of between −180° and +180°, and as a result of which the full circle can be completely and clearly sensed by the angle sensor 8 specified here.

Figure 2A:
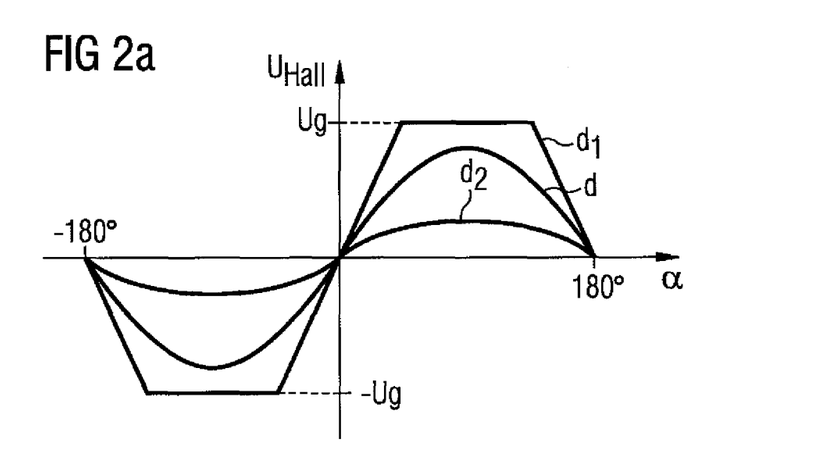
FIG. 2a is a graph of the output signal of the first sensor element or of the second sensor element for different distances.

FIG. 2a shows the output signal of the first sensor element 4 or of the second sensor element 5 for different distances d, $d_1$, $d_2$ between the rotatable element 3 and the plane of the first sensor element 4 and of the second sensor element 5. The optimum distance is denoted here by d, a distance smaller than the optimum one is denoted by $d_1$, and a distance larger than the optimum one between the rotatable element 3 and the plane of the first sensor element and of the second sensor element 5 is denoted by $d_2$. For the sake of simplicity, only the sine profile of the signal of the first sensor element 4 is illustrated in FIG. 2a, wherein the cosine profile of the signal of the second sensor element 5 would behave in an analogous fashion. Given an optimum distance d between the rotatable element 3 and the plane of the first sensor element 4 and of the second sensor element 5, the already known sine function, which is characterized by the reference symbol d in FIG. 2a, is obtained. If the distance between the rotatable element 3 and the plane of the first sensor element 4 and of the second sensor element 5 is then increased, a significantly flatter profile of the sine function, characterized in FIG. 2a by the reference symbol $d_2$, is thus obtained. Since the analysis of the signals supplied by the angle sensor 8 is generally carried out by an analog/digital converter, a large dynamic range of the analog/digital converter would remain unused as a result of the very flat profile of the sine curve, and the measurement results are therefore degraded since a relatively small range of digital values also permit a smaller resolution to be achieved. Given a significant reduction in the distance $d_1$ between the rotatable element 3 and the plane of the first sensor element 4 and of the second sensor element 5, the situation characterized by $d_1$ in FIG. 2a would come about. The sine signal which can be seen here is cut off at cutoff voltage $U_g$ since the subsequent analog/digital converter is overdriven, as a result of which no resolution at all of the rotational angle of the rotor 2 can be achieved any more in wide rotational angle ranges. Both the increased distance $d_2$ and the reduced distance $d_1$ between the rotatable element 3 and the plane of the first sensor element 4 and of the second sensor element 5 lead to very poor measurement results which are not acceptable within the scope of application of the angle sensor 8 in automobile technology.

Figure 3:
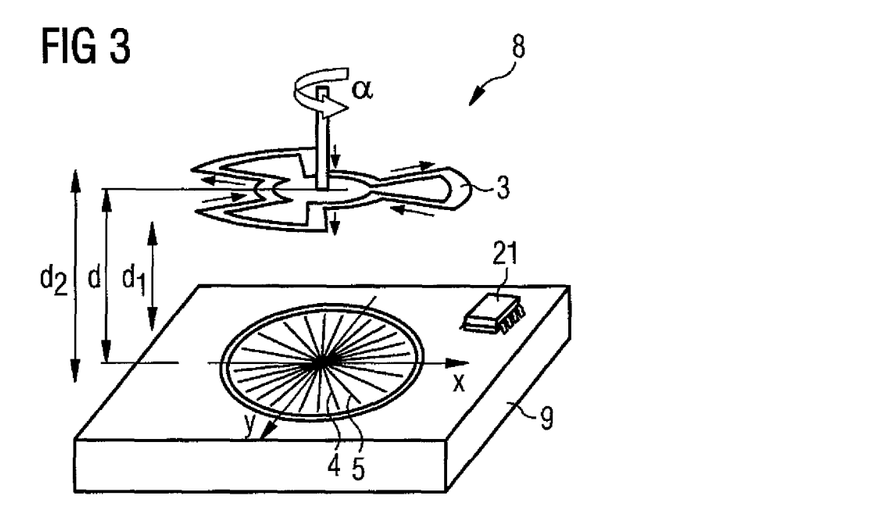
FIG. 3 is an angle sensor which is based on the principle of electromagnetic induction of a field in the first sensor element and the second sensor element.

FIG. 3 shows an angle sensor 8 based on the principle of electromagnetic induction of a field in the first sensor element 4 and the second sensor element 5. The sensor elements 4, 5 are embodied as coil arrangements, for example on a printed circuit board 9. The rotatable element 3 is designed here to vary an electromagnetic field and is connected to the rotor 2 of the brushless electromotor 1. When the rotatable element 3 rotates, the electromagnetic field is sensed by the first sensor element 4 and the second sensor element 5, embodied here as a pair of coils on a sensor printed circuit board 9. In an integrated circuit 21 on the sensor printed circuit board 9 there are the analysis electronics for the signals of the first sensor element 4 and the second sensor element 5. These analysis electronics are composed of amplifiers 10, controlled amplifiers 11, which are also referred to as operational amplifiers, low-pass filters 12, high-pass filters 13 and inverters 14.

Figure 4:
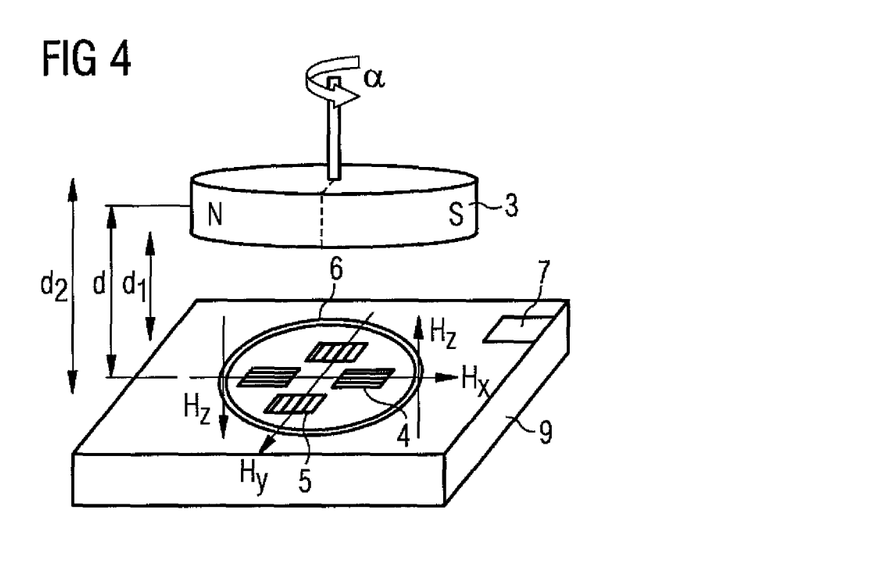
FIG. 4 is a 3-D-Hall element.

FIG. 4 shows the design of a 2-D Hall element known in principle from FIG. 1 expanded by a third dimension to form the 3-D Hall element. Located on the sensor chip 9 are the first sensor element 4 and the second sensor element 5 which form, with the sensor chip 9, the plane in which the magnetic field induced by the element 3 in order to vary the magnetic field, is measured. The element 3 for varying the magnetic field is embodied here as a permanent magnet with a north pole N and south pole S. Furthermore, there is a third sensor element 6, as a result of which the sensor chip 9 shown here is expanded to what is referred to as a 3-dimensional Hall element (3-D Hall element). Furthermore, a temperature sensor element 7 is integrated into the sensor chip 9. This temperature sensor element 7 measures the temperature prevailing in the angle sensor 8. Changes in temperature in the angle sensor 8, in particular in the sensor elements 4, 5 and 6, can lead to a massive change in the signals generated by the sensor elements 4, 5 and 6.

The method for analyzing signals of an angle sensor 8 having at least two sensor elements 4 and 5 which span a plane and having a rotatable element 3 which is spaced apart from this plane and has the purpose of varying the field will be explained in more detail in the following figures.

Figure 5:
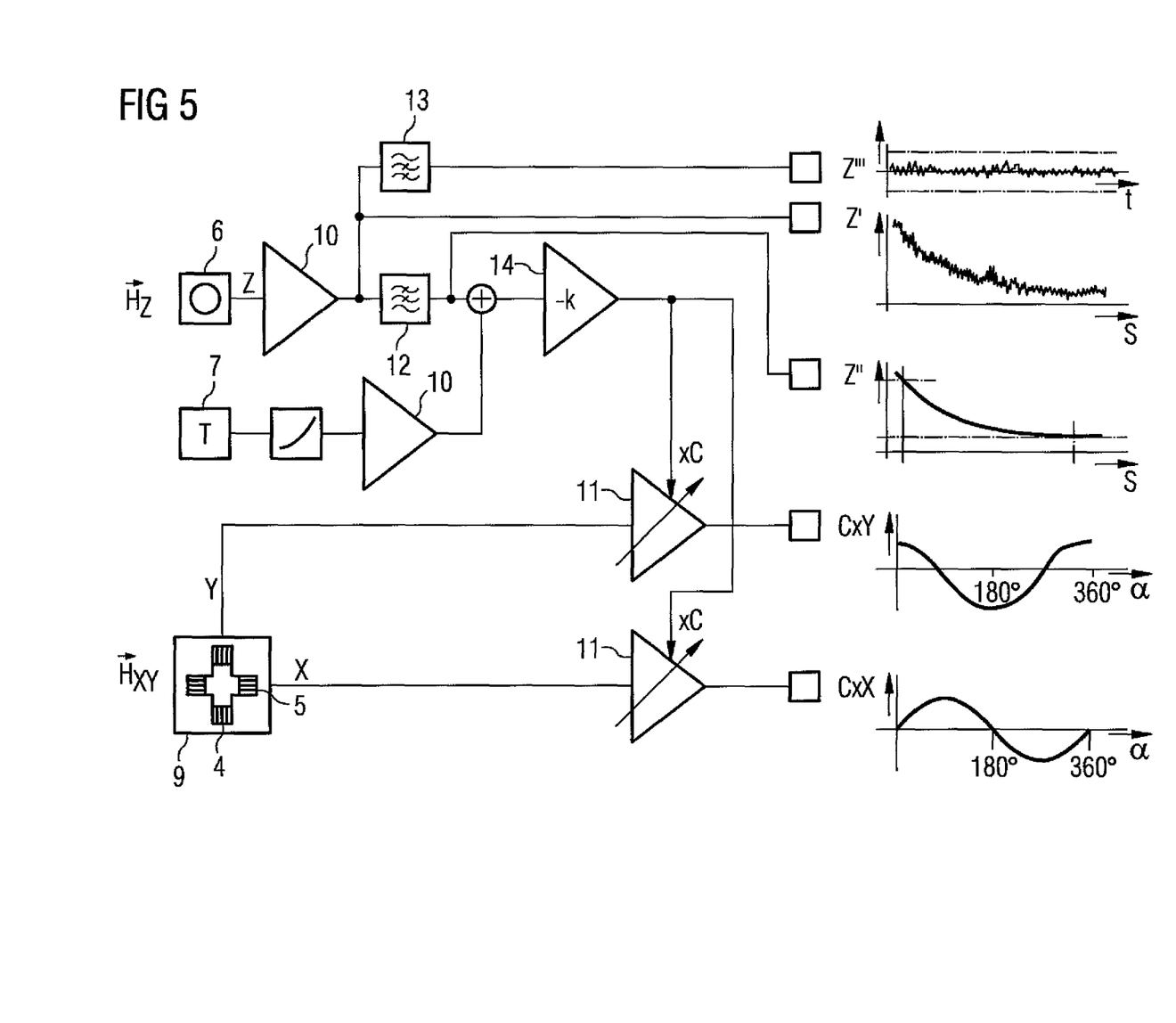
FIG. 5 is a schematic diagram the method for analysing signals of an angle sensor with a 3-dimensional Hall element.

In FIG. 5, the sensor elements 4 and 5 sense at least a first and a second vector 15 and 16, independent of one another, of the field $H_X$, $H_Y$ in this plane. In addition, a third vector 17 which is linearly independent of the first and second vectors 15 and 16 and which represents the absolute value of the field $H_Z$ in the z direction, is sensed, wherein this absolute value is dependent on the distance d between the plane and the rotatable element 3, and wherein the amplitude of the signals of the sensor elements 4 and 5 is controlled with this absolute value. The first sensor element 4 and second sensor element 5 are arranged here in the plane of the sensor chip 9. The magnetic field vectors 15 and 16 which are sensed by the first sensor element 4 and the second sensor element 5 are as electric signals to the controllable amplifiers 11. These controllable amplifiers 11 are generally embodied as operational amplifiers. Since the signals which are sensed by the first sensor element 4 and the second sensor element 5 are greatly dependent on the distance d between the rotatable element 3 and the plane of the sensor chip 9, the distance d is sensed by the third sensor element 6, which measures the z component of the magnetic field $H_Z$ here. The signal which is sensed by the third sensor element 6 is fed via a first amplifier 10 and a low-pass filter 12, which filters away high-frequency signals to an analog inverter 14, as a result of which control variables for the controllable amplifiers 11 are available here with which the signal strength of the distance d, $d_1$, $d_2$ between the rotatable element 3 and the plane of the sensor chip is tracked in a manner corresponding to the first sensor element 4 and the second sensor element 5. These corrected signals from the first sensor element 4 and the second sensor element 5 are then made available to analog/digital converters, which can therefore always operate in the full range of their resolution and bandwidth without being overdriven in this instance. Furthermore, in this method, the temperature T of the temperature sensor element 7 is sensed, which temperature prevails within the angle sensor 8. This temperature measurement value can also be included by means of an amplifier 10 in the correction of the signals from the first sensor element 4 and from the second sensor element 5. As a result of the method according to the invention, a complete correction of distance fluctuations and temperature fluctuations within the angle sensor 8 is possible, as a result of which full-circle-coverage angle sensor elements can be used cost-effectively within the scope of automobile applications. Furthermore, FIG. 5 shows a high-pass filter 13. The available signals are illustrated. On the basis of the signal from the third sensor element 6 it is possible, after amplification 10 and high-pass filtering 13, to detect a rapid change in distance between the rotatable element 3 and the sensor chip 9. This rapid change in distance would provide, for example, an indication of a defective bearing of the rotor 2 in the brushless electric motor 1. The low-pass filtering 12 of the signal from the third sensor element 6 generates a signal for a slow change in distance d between the rotatable element 3 and the plane of the sensor chip 9. This slow change in distance can be triggered by temperature expansion of the overall system.

Figure 6:
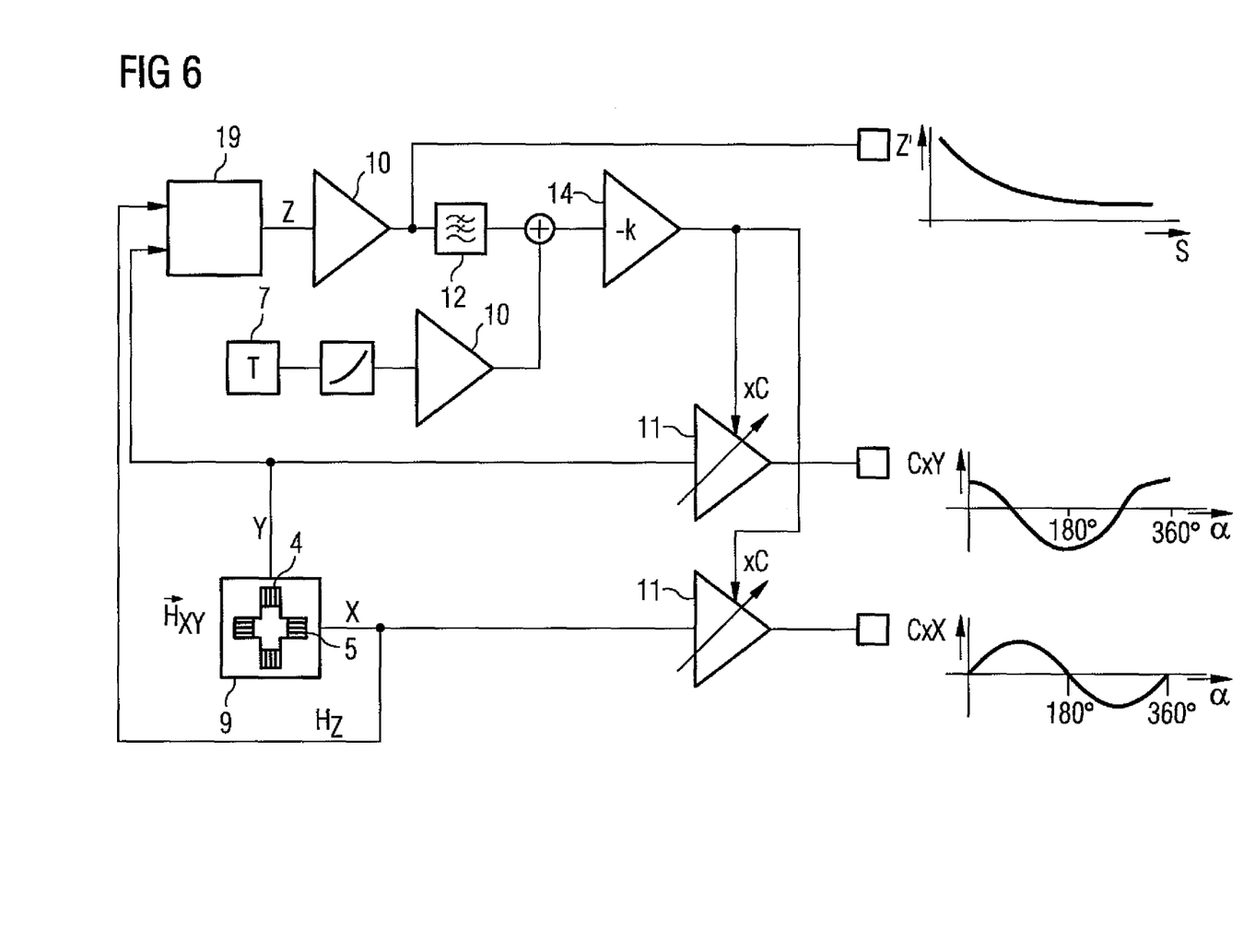
FIG. 6 is a schematic diagram the method for analyzing signals of an angle sensor with a 2-dimensional Hall element.

FIG. 6 shows a further refinement of the invention. Here, the further variable 17, dependent on the distance d, $d_1$, $d_2$, is derived from the first and second vectors 15, 16 which are linearly independent of one another and which are sensed by the sensor elements 4, 5. For this purpose, for example the resulting absolute value of the first and second linearly independent vectors 15, 16 are formed by Pythagoras's theorem in a computational circuit 19. The absolute values of the individual linearly independent vectors 15, 16, which are represented chronologically as sine signals and cosine signals, are larger when there is a relatively small distance $d_1$ between the rotatable element 3 and the plane of the first sensor element 4 and of the second sensor element 5, and become smaller as the distance increases. As a result, the computation circuit 19 can supply largely angle-independent information about the distance d between the rotatable element 3 and the plane of the first sensor element 4 and of the second sensor element 5.

Figure 7:
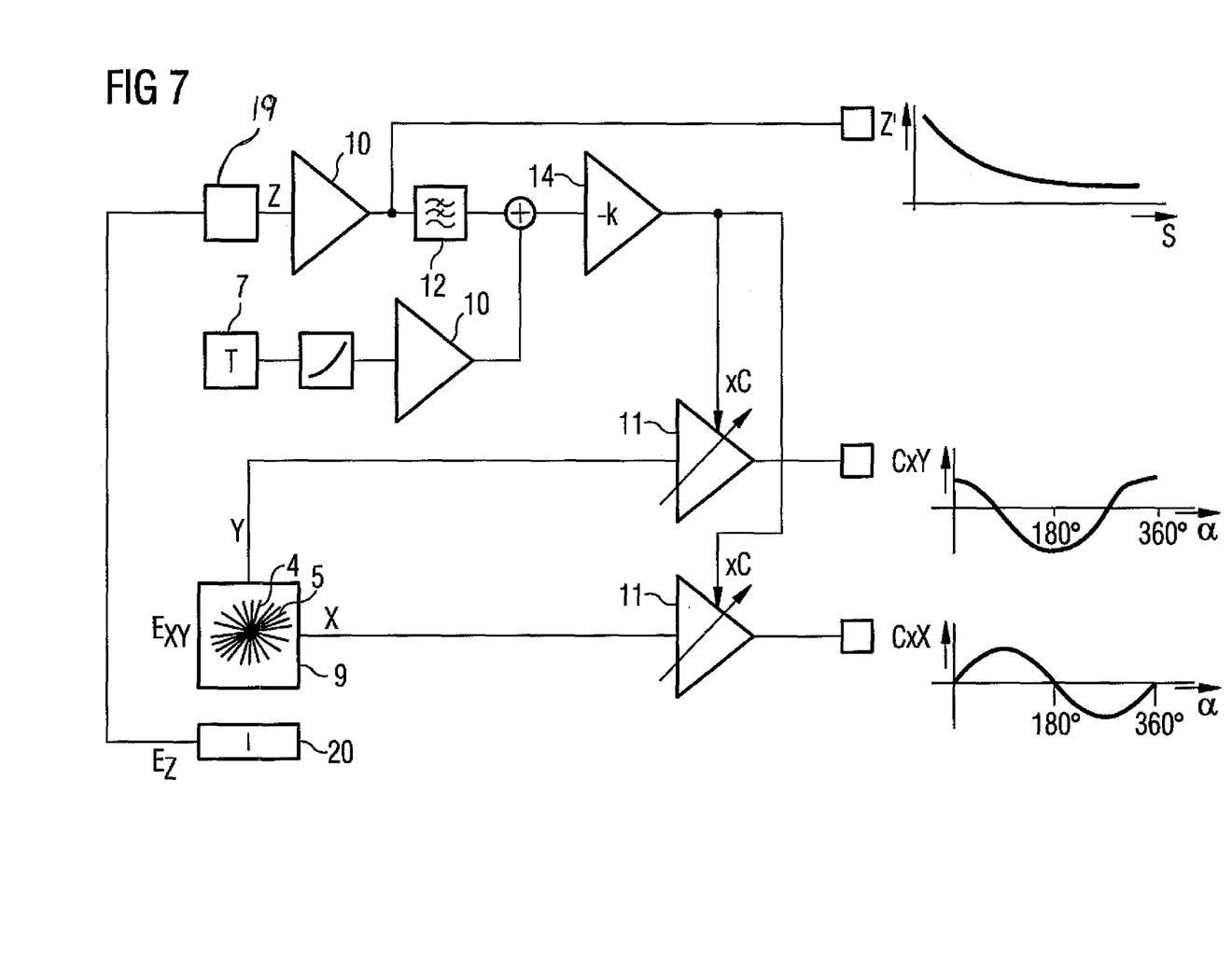
FIG. 7 is a schematic diagram for analyzing signals of an angle sensor with inductive sensor elements.

FIG. 7 shows a subsequent refinement of the invention. The further variable 17 which is dependent on the distance the distance d between the rotatable element 3 and the plane of the first sensor element 4 and of the second sensor element 5 is derived here from the supply current 20 for operating the inductive sensor elements 4, 5. For the inductive measuring method, an electromagnetic alternating field is generated, as a result of which an eddy current is induced in the rotatable element 3. The absolute value of the eddy current rises as the distance d becomes smaller and falls as the distance d becomes larger. The absolute values of the linearly independent vectors 15, 16 in their chronological representation as sine signals and cosine signals also become larger as the distance $d_1$ becomes smaller and fall as the distance $d_2$ becomes larger. The computational circuit 19 can therefore also provide largely angle-independent information about the distance d between the rotatable element 3 and the plane of the first sensor element 4 and of the second sensor element 5.

Figure 8:
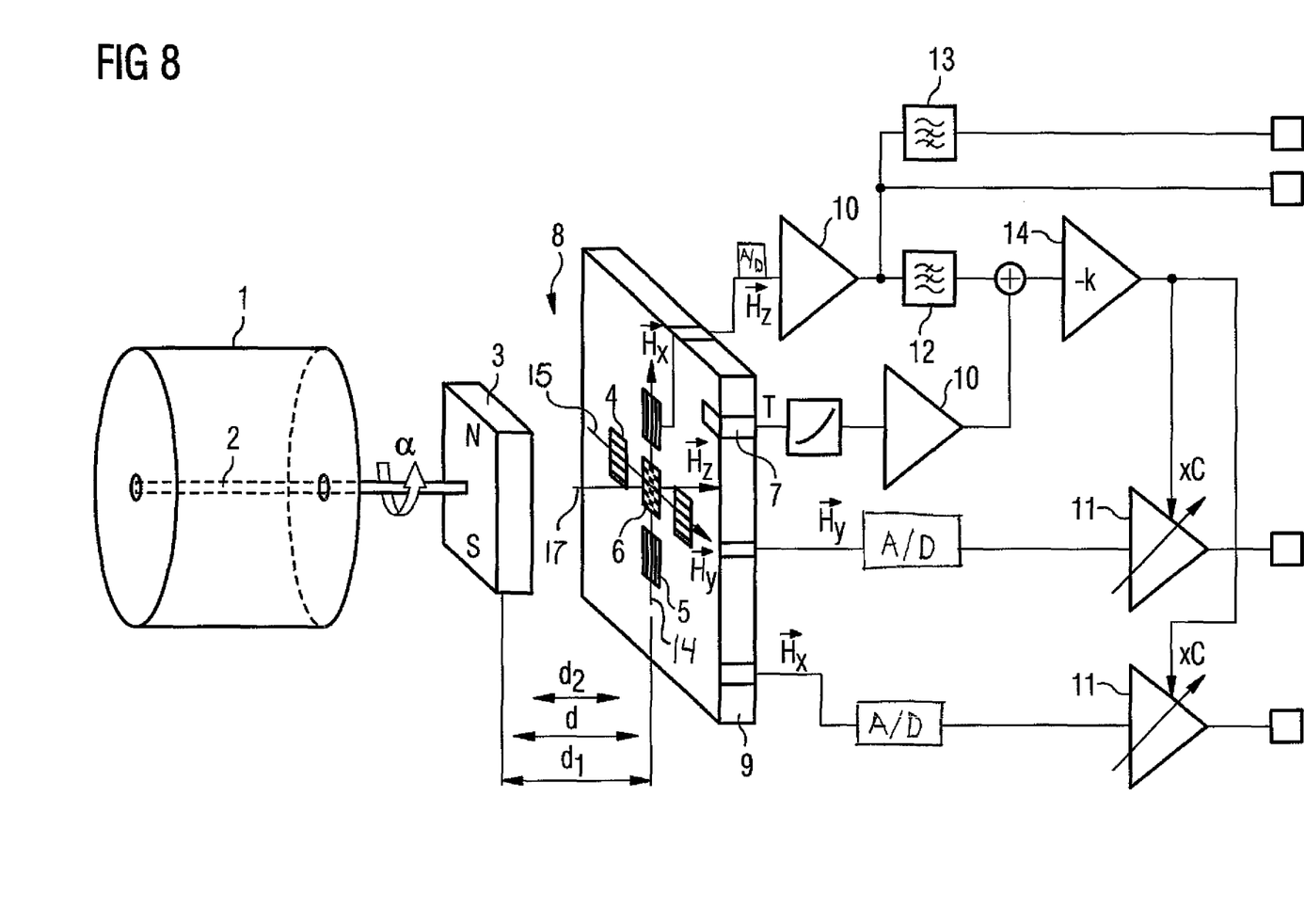
FIG. 8 is a possible overall system.

The representation of a possible overall system is found in FIG. 8. Here, a brushless electromotor 1 is illustrated with a rotor 2, wherein the rotatable element 3 for varying a magnetic field is arranged on the rotor 2. In accordance with the rotational angle α, the rotatable element 3 will induce a characteristic magnetic field in the sensor chip 9. This characteristic magnetic field is picked up by the first sensor element 4, the second sensor element 5 and the third sensor element 6. The distance between the rotatable element 3 and the sensor chip 9 can vary, which is represented by the reference symbols $d_2$, $d_1$ and $d_0$ here. This variation in the distance d between the rotatable element 3 and the plane in which the first sensor element 4 and the second sensor element 5 are arranged is sensed by the third sensor element 6 by the magnetic field component $H_Z$. As a result, the third sensor element 6 provides a correction value $H_Z$ that is fed to the controllable amplifiers 11 via the first amplifier 10 and a low-pass filter 12 as well as an inverter 14.

The magnetic field values $H_Y$ and $H_Z$ are sensed by the first sensor element 4 and the second sensor element 5, as a result of which the first sensor element 4 acquires a first linearly independent vector 15 and the second sensor element 5 senses a second linearly independent vector 16. The angle $\alpha$ can be inferred clearly by a CORDIC algorithm on the basis of the combination of these two linearly independent vectors. The distance dependence between the rotatable element 3 and the sensor chip 9 is corrected in the controllable amplifiers 11, as a result of which a clear resolution, which is high in terms of measuring technology, of the 360° full circle is possible with the angle sensor 8 illustrated here.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for analyzing signals from an angle sensor having a plurality of sensor elements that span a plane and a rotatable element spaced apart from the plane to vary a field, the method comprising:
   sensing by first and second ones of the plurality of sensor elements at least a first vector and a second vector, wherein the first vector and the second vector are linearly independent of one another;
   sensing by a third one of the plurality of sensor elements a third vector representing a distance between the plane and the rotatable element;
   deriving, from the third vector, a further variable that is dependent on the distance between the plane and the rotatable element; and
   controlling amplitudes of signals of the first and second sensor elements with an absolute value of the further variable.

2. The method as claimed in claim 1, further comprising:
   diagnosing an incorrect distance between the plane and the rotatable element based at least in part on the absolute value of the further variable.

3. The method as claimed in claim 1, further comprising:
   removing information relating to fast changes in the distance between the plane and the rotatable element from the absolute value of the further variable by a low-pass filter.

4. The method as claimed in claim 1, wherein the rotatable element is one of a magnet, a coil, a yoke, and a piece of sheet metal.

5. The method as claimed in claim 4, wherein the sensor elements are one of giant magnetoresistive sensor elements (GMR), tunnel magnetoresistive sensor elements (TMR), and Hall sensor elements.

6. The method as claimed in claim 1, wherein each of the sensor elements are magnetic-field-sensitive elements.

7. The method as claimed in claim 1, wherein the sensor elements pick up electromagnetic fields.

8. The method as claimed in claim 7, wherein at least one of the sensor elements is an inductive sensor element.

9. The method as claimed in claim 8, wherein the inductive sensor element is a coil.

10. The method as claimed in claim 1, wherein the angle sensor is configured to sense a full circle.

11. The method as claimed in claim 1, wherein sine signals and cosine signals are generated from the signals of the first and second vectors which are linearly independent of one another.

12. The method as claimed in claim 1, further comprising:
    digitizing analog signals of the vectors by an analog/digital converter.

13. The method as claimed in claim 1, wherein the third vector is linearly independent of the first and second vectors

\* \* \* \* \*